United States Patent
Hohn

[11] 3,909,600
[45] Sept. 30, 1975

[54] METHOD AND APPARATUS FOR CONTROLLING AN AUTOMATION ALONG A PREDETERMINED PATH

[75] Inventor: Richard Edward Hohn, Cincinnati, Ohio

[73] Assignee: Cincinnati Milacron, Inc., Cincinnati, Ohio

[22] Filed: May 31, 1973

[21] Appl. No.: 364,381

Related U.S. Application Data

[63] Continuation-in-part of Ser. No. 265,984, June 26, 1972, abandoned.

[52] U.S. Cl. .............. 235/151.11; 444/1; 235/152
[51] Int. Cl.² .................... B25J 09/00; G06F 15/46
[58] Field of Search ............ 214/1 CM, 1 BD, 1 BC; 318/575, 574, 573; 235/151.11, 151

[56] References Cited
UNITED STATES PATENTS

| | | | |
|---|---|---|---|
| 3,123,657 | 3/1964 | Clark, Jr. .................... | 235/151.11 X |
| 3,128,374 | 4/1964 | Yuchiho et al. ................ | 235/152 X |
| 3,543,910 | 12/1970 | Devol ............................. | 214/1 BD |
| 3,816,736 | 6/1974 | Krohn ............................ | 235/151.1 |
| 3,843,875 | 10/1974 | Goodstal ........................ | 235/151.11 |

OTHER PUBLICATIONS

"Resolved Motion Rate Control of Manipulators and Human Prostheses," IEEE Transactions on Man Machine Systems, Vol. MMS-10, No. 2, June 1969.
"The Mathematics of Coordinated Control of Prosthetic Arms and Manipulators," ASME publication, No. 72-WA/AUT-4, Jan. 1973.
"A Computer Aided Teleoperator System," Space Nuclear Propulsion-NASAL, AEC, (grant No. 36-00-3-042) Final Report, No. 1-70-80, Feb. 1970.
"Controlling a Remote Manipulator with the Aid of a Small Computer," ASME Publication, No. 70-DE.18, 12-1969.

*Primary Examiner*—Eugene G. Botz
*Attorney, Agent, or Firm*—C. Richard Eby

[57] ABSTRACT

A method and apparatus for controlling a function element of an automaton at a predetermined velocity and acceleration along a predetermined path in space between two predetermined points. The automaton has a plurality of axes of motion, at least one of which is an axis of rotary motion for moving a function element along the predetermined path. The automaton has other axes of motion for controlling the orientation of the function element in a predetermined manner while said element is moving from one position to another position. From an input, signals are generated representing the predetermined velocity and rectangular coordinate values of end points of the predetermined path; and the disclosed apparatus is operative on a fixed time basis to iteratively calculate a number of incremental displacements. Coordinate values defining each of the increments are calculated, and these coordinate values are transformed into corresponding generalized coordinate values defined by the geometric configuration of the automaton. A servomechanism drive circuit is responsive to output signals representing changes in the generalized coordinate values along each incremental displacement for causing actuators on the automaton to move proportionally. Hence, the automaton is moved at a predetermined velocity along the predetermined path.

27 Claims, 11 Drawing Figures

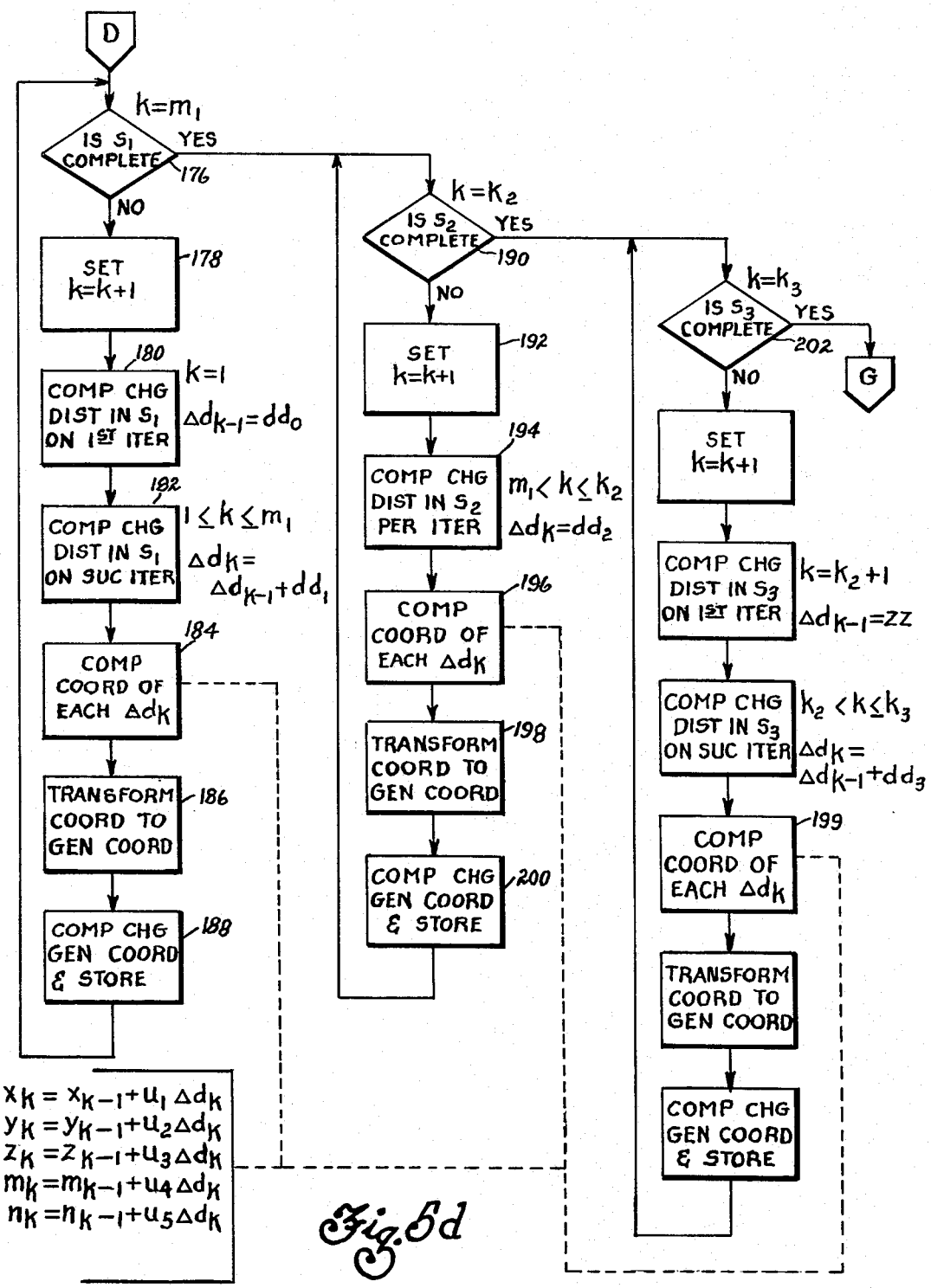

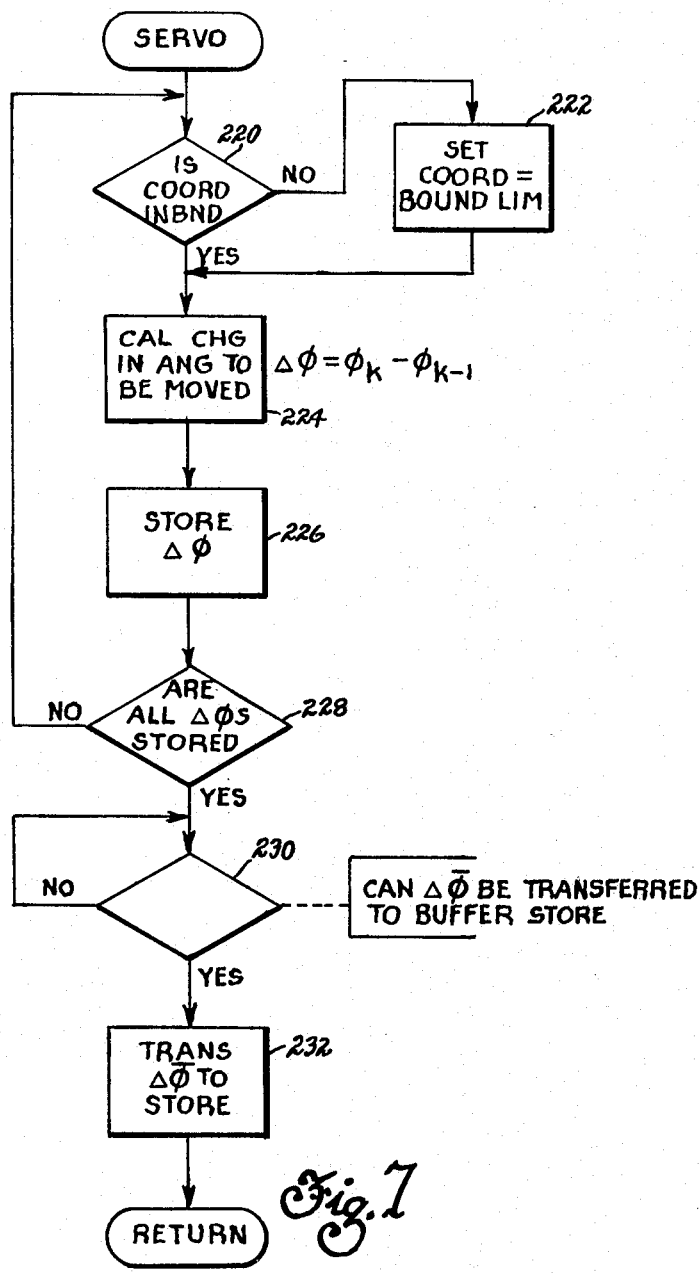

METHOD AND APPARATUS FOR CONTROLLING AN AUTOMATION ALONG A PREDETERMINED PATH

BACKGROUND OF THE INVENTION

This application is a continuation-in-part of copending application Ser. No. 265,984 filed on June 26, 1972 now abandoned.

This invention relates generally to the control of automata which are also referred to as programmable manipulators or, in a more limited embodiment, industrial robots. Specifically, the invention is applicable to an automaton having a plurality of axes of motion which determine the position and orientation of a function element thereon, e.g., a hand, toolholder, etc. The apparatus of the invention executes a process which coordinates the axes of motion to move the function element of the automaton along a straight line between any two points in space while maintaining a predetermined orientation. There is substantial prior art in the area of manipulators and limited prior art in the area of automata. The prior art discloses a multitude of mechanical configurations. Typically, an automaton requires three degrees of freedom or three controlled axes of motion to control the position of an element at a point in space. In addition to position, it may be desirable to control the orientation of the element during positioning or after positioning. Therefore, the element may require an additional one, two or three degrees of freedom independent of the positioning axes of motion. For example, to control the orientation of the element along a vector through a point in space requires a minimum of five degrees of freedom; and if the element has planar characteristics, six degrees of freedom are required to control the element in a plane through a point in space. The automaton applicant discloses has three controlled axes of motion to control the position of the element in space. Two further controlled axes of motion and one indexing axis of motion are provided to control the orientation of the element.

Practically, an automaton must operate in a man-orientated world. Typically, such a world is dominated by vertical and horizontal planes. Therefore, the most obvious configuration is one where the degrees of freedom for controlling position define a rectangular coordinate system. Such a configuration is widely adopted as a typical machine design and provides an apparatus which in combination with existing control systems readily permits motion in any horizontal or vertical plane. In spite of its obvious advantage in a great number of general applications, the rectangular coordinate configuration has several disadvantages. First, the corresponding rectilinear drive systems may be relatively complex and expensive. Second, a device of this nature is necessarily bulky and consumes substantial floor space. Finally, the operating range is constrained to a rectangular volume which may limit its application flexibility.

In order to overcome the above disadvantages, several changes can be made. By replacing one or more of the axes of linear motion with axes of rotary motion, the range of the device is expanded to a cylindrical or spherical volume. One gains an inherent further advantage in that driving mechanisms for axes of rotary motion are generally simpler and lower cost mechanisms. Further, with the use of rotary joints, the overall size and floor area required by the device is reduced. However, such a device has one major disadvantage. When axes of rotary motion are used either alone or in combination with axes of linear motion, one has substantial difficulty in coordinating the axes of motion to define a path for the automaton to follow. It is this problem which applicant's invention solves. For purposes of illustration, applicant's automaton is comprised of five controlled axes of rotary motion. However, applicant's claimed apparatus is applicable to any system having one or more axes of rotary motion affecting the position of the function element.

Typically, the automaton must function in a manmade world of horizontal and vertical planes. Applicant has determined that it would be most advantageous to move a point on the function element of the automaton in a straight line path between any two predetermined points in space while maintaining a predetermined orientation. As will be appreciated by those who are skilled in the art, in particular applications, it may be desirable to control a point on the function element along some other predetermined path in space while maintaining orientation. However, applicant's choice of a straight line path has several inherent advantages. By only requiring the definition of the two end points, the problem of teaching the automaton is substantially reduced. Further, appropriate changes in velocity can be readily calculated to provide smooth starting and stopping along the predetermined path. In addition, since a point thereon is always moving along a straight line, an object in the function element is not subject to inertial forces traverse to the path which would be expected in a system having axes of rotary motion. When moving a heavy object, the above feature is of substantial importance.

SUMMARY OF THE INVENTION

Applicant claims a method and apparatus for controlling an element of an automaton along a predetermined path. The automaton has a plurality of actuators for producing a plurality of axes of motion. Further, the automaton has a geometric configuration defining a set of generalized coordinates. The apparatus comprises means for storing signals representing a predetermined path velocity between and coordinate values of end points of the predetermined path. Means are provided which are responsive to the signals for producing a first set of signals representing a plurality of coordinate values which define a plurality of incremental displacements along the predetermined path. Means are further provided for receiving the first set of signals and generating therefrom a set of individual control signals representing corresponding generalized coordinate values. Finally, means are responsive to the individual control signals for driving the autuators and thereby moving the automaton along the predetermined path at the predetermined path velocity.

BRIEF DESCRIPTION OF THE DRAWINGS

FIGS. 5a, 5b, 5c and 5d illustrate a detailed flow chart of applicant's method of control.

FIG. 7 is a detailed flow chart illustrating applicant's method of generating signals to be output to a servo mechanism circuit.

DESCRIPTION OF THE PREFERRED EMBODIMENT

Figure 1:
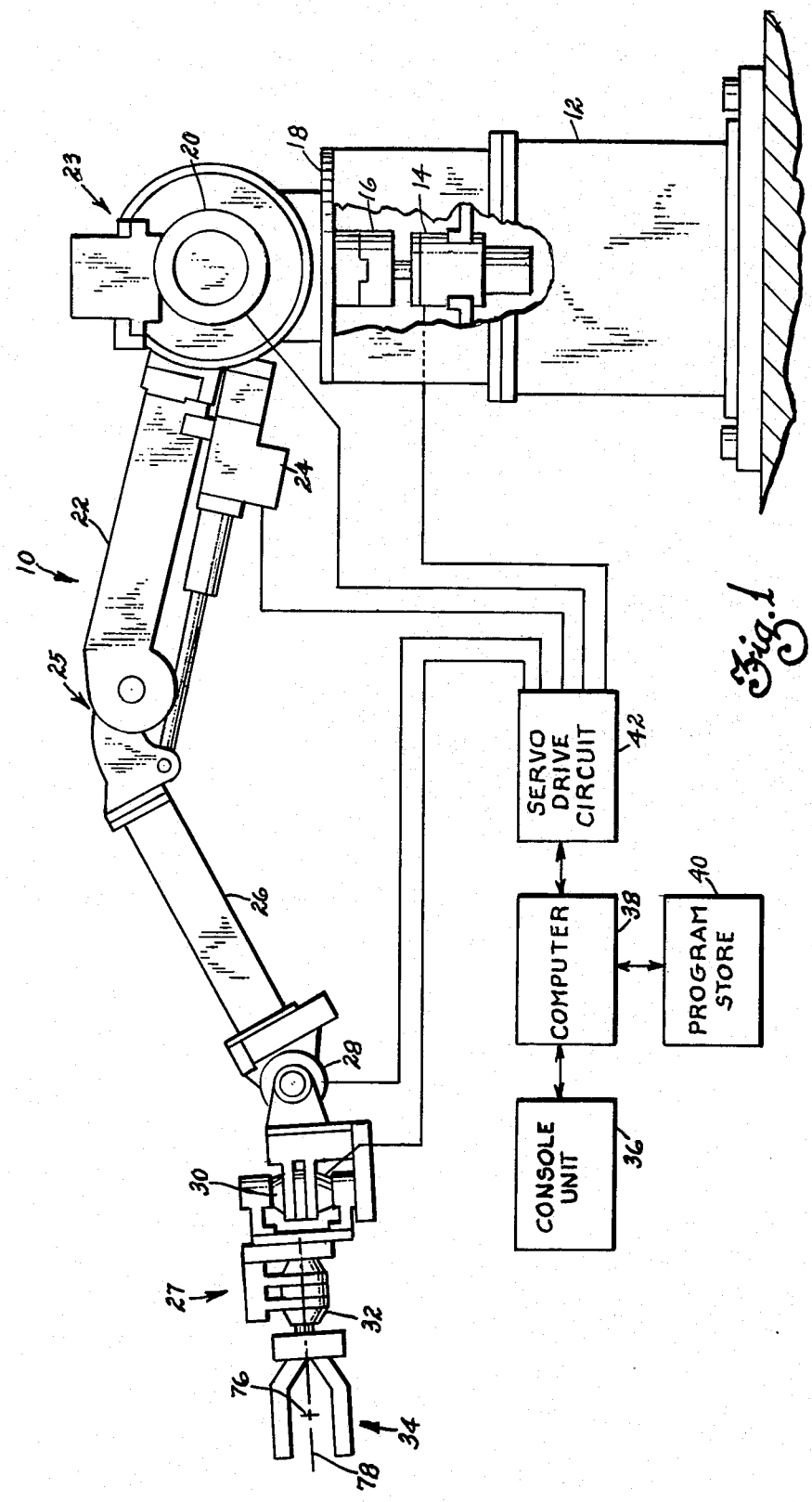
FIG. 1 is an overall view of an automaton and illustrates its relationship to a general block diagram of the control.

FIG. 1 is a general block diagram of the apparatus of applicant's invention wherein the general configuration of an automaton 10 is illustrated. The detailed structure defining the general configuration of the automaton is not important to applicant's present application. Applicant's invention is applicable to any automaton having at least one axis of rotary motion affecting the position of a function element. Applicant has chosen to illustrate an automaton having exclusively axes of rotary motion. A base 12 contains an actuator 14 which is connected by means of a coupling 16 to a rotatably mounted plate 18. It should be noted at this point that the exact nature of the actuator 14 is not significant to this disclosure. Prior art methods of actuator control whether the acutator is electric, hydraulic, pneumatic, etc. are applicable. Rigidly fixed to the plate 18 is an actuator 20 providing a second axis of rotation. Attached to a working member of the actuator 20 is an upper arm 22. The mechanical joint between the upper arm 22 and the actuator 20 will be generally referred to as the shoulder joint 23. Affixed to the upper arm 22 is an actuator 24 which provides a rotation of a lower arm element 26 about the upper arm 22. The mechanical joint joining the upper armm 22 to the lower 26 will be referred to as the elbow joint 25.

The actuator 14, 20, and 24 are sufficient to move the end of the arm 26 to any point in space within the range of the automaton. Therefore, when the position of the automaton is discussed in the disclosure, one will be referring to these three axes of rotary motion. Similarly, these three axes of rotation must be controlled to define the predetermined path of the automaton. A hand 27 is comprised of rotary actuators 28, 30 and 32 and a function element 34, e.g. a gripper. In addition to position, it may be required that an object in the function element maintain a predetermined relationship a fixed object while changing position. This requirement is generally referred to as orientation. In contrast, it may be required that the load in the function element asssume a new orientation with a new position. The apparatus disclosed by applicant is inherently capable of changing the orientation of the function element in proportion to the change in the position of the element along the predetermined path.

It should be noted that the distinctions between position and orientation drawn above are not absolute. As will be appreciated by those skilled in the art, when it is necessary to change the orientation, many times the actuators at 14, 20 and 24 will have to modify the position of the function element to accomodate the new orientation. Conversely, when only a change in position is required, the actuators 28, 30 and 32 will have to be activated to maintain the same orientation as the position of the function element is changed. In applicant's system, on the hand 27, only the actuators 28 and 30 are controlled axes of motion. The actuator 32 provides motion to the function element by indexing through predetermined increments. Its primary purpose is for inverting an object in the function element. Finally, function element 34 has a small actuator (not shown) for generating the function, e.g. gripping action. Inasmuch as in the disclosed embodiment the actuator 32 and the actuator for the function element 34 do not represent controlled axes of motion, their structure will not be discussed in further detail.

A console unit 36 is provided as a communication link to the automaton. The console may include general control functions and input devices for generating an input to enable a predetermined cycle of operation. It may further include controls for teaching the automaton a cycle of operation by the lead-through method or another programming technique. A computer 38 uses a program from a program store 40 and input signals produced by means of the console unit 36 to generate a predetermined path therefrom and thereby produce electrical signals to a servomechanism drive circuit 42. The drive circuit 42 commands the actuators on the automaton to move the function element at a predetermined path velocity along the predetermined path between end points defined by the input signals.

Since the servomechanism drive circuit may be of any standard design typically used on numerically controlled machine tools, they will be discussed generally but not illustrated in detail. Any typical servomechanism may be used, but applicant favors a phase modulation system. In applicant's system, an output signal for each coordinate axis is transferred from the computer to a register or other storage device. A command signal for each coordinate axis is generated having a phase shift proportional to the magnitude of a corresponding output signal. The shift in phase for each coordinate axis produces a drive signal to a corresponding actuator. The actuator causes the automaton to move while producing a proportional phase shift in a feedback signal generated by a feedback device coupled to the actuator. When the feedback signal is in phase with the command signal, the drive signal is reduced to zero and the actuator stops, Consequently, the automaton has been moved an incremental distance in space corresponding to the magnitude of the output signals. In essence, the automaton follows the predetermined path in space between the two predetermined path points at the predetermined velocity.

Figure 2:
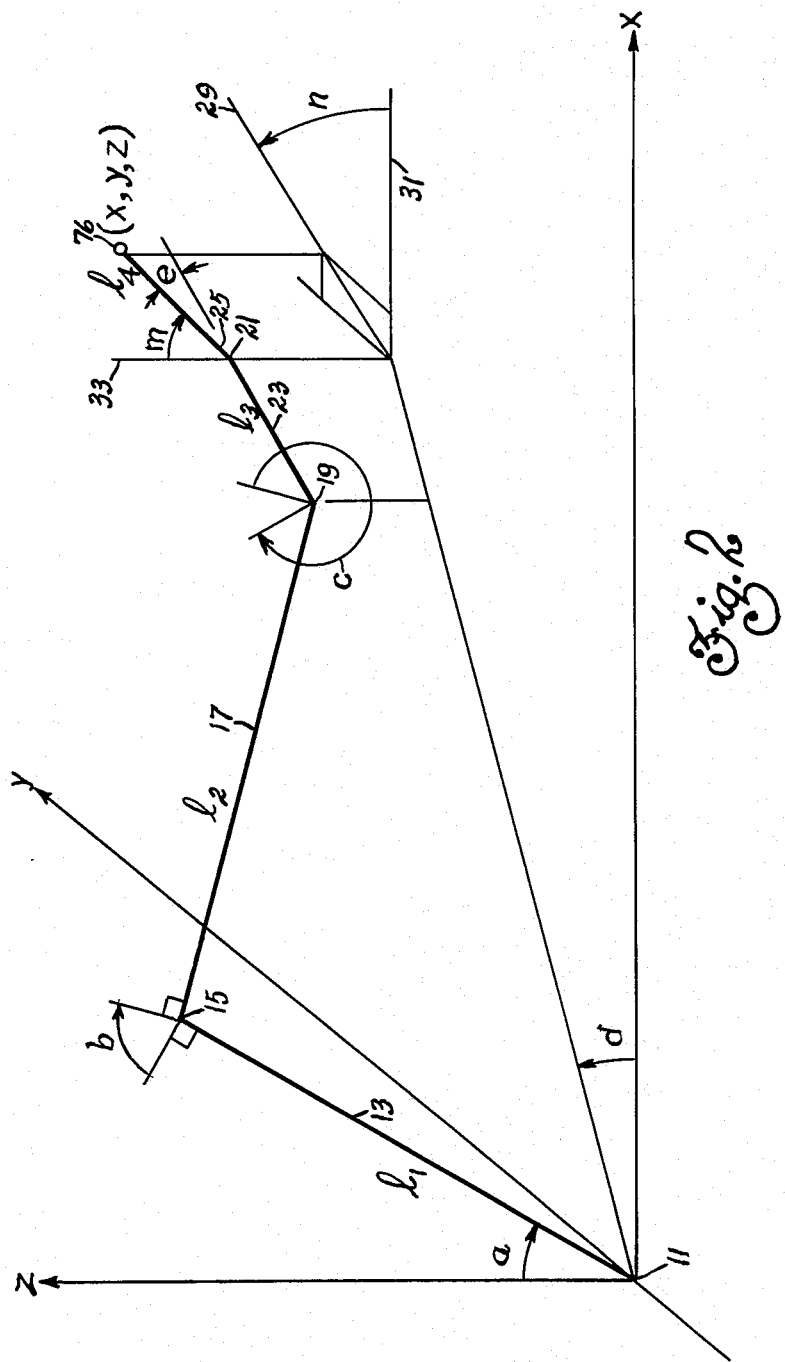
FIG. 2 is a graphical representation of the automaton which illustrates th relationship between a rectangular coordinate system and the generalized coordinate system.

FIG. 2 is a graphical representation illustrating a generalized coordinate system of the automaton within a rectangular coordinate system. The origin 11 of the rectangular coordinate system is located at the intersection of the axis of rotation of the base and the axis of rotation in the shoulder joint. The line segment 13 corresponds to the upper arm 22, the intersection 15 corresponds to the elbow joint 25, and the line segment 17 corresponds to the lower arm 26. The actuators 28 and 30 are represented by the intersections at points 19 and 21 respectively. The line segment 23 represents the distance between the actuators 28 and 30, and the line segment 25 represents the distance between the point 76 in FIG. 1 and the actuator 30. The ultimate purpose of applicant's invention is to continuously control the position, orientation and velocity of the function element 34. As discussed earlier, applicant has chosen a straight line for his predetermined path; and further, applicant has determined that the straight line is to be generated from the coordinate values of the end points thereof. The position of the point 76 can be readily defined by $x$, $y$, and $z$ coordinate values. Further, the orientation of the function element which is defined in reference to the line segment 25 can be determined by the angular coordinates $m$ and $n$. The angle $m$ is included between the segment 25 and a segment 33 which is parallel to the $z$-axis. The angle $n$ is defined between the segment 29 which is a projection of the segment 25 into the XY plane and a segment 31 which is a line parallel to the X-axis. Consequently, the rectangular coordinate value $(x, y, z)$ defines the position of the point 76 in space, and the values of the angular coordinates $m$ and $n$ define the orientation of the segment 25 in space.

The problem now becomes how does one command the motion of the rotary axes of the automaton with the rectangular coordinate data defining position and orientation. One can readily see that the axes of rotary motion inherent in the automaton cannot be directly defined by a rectangular coordinate system; therefore, one must resort to a generalized coordinate system having its parameters and constraints as a function of the geometric configuration. In the present case, the parameters of the generalized coordinate system are the angles defined by the axes of rotation $a$, $b$, $c$, $d$, and $e$, and the linear segments which are between the axes of rotation. The solution of the above problem represents one of the key elements of applicant's invention. Applicant believes the disclosed apparatus has the unique ability to respond to data defining a predetermined path and velocity relative to a first coordinate system and command a machine defining by a second coordinate system by producing a locus of unprogrammed points relative to said first coordinate system and generating corresponding individual control signals relative to the second coordinate system thereby moving a machine element along the predetermined path at the predetermined path velocity.

Figure 3:
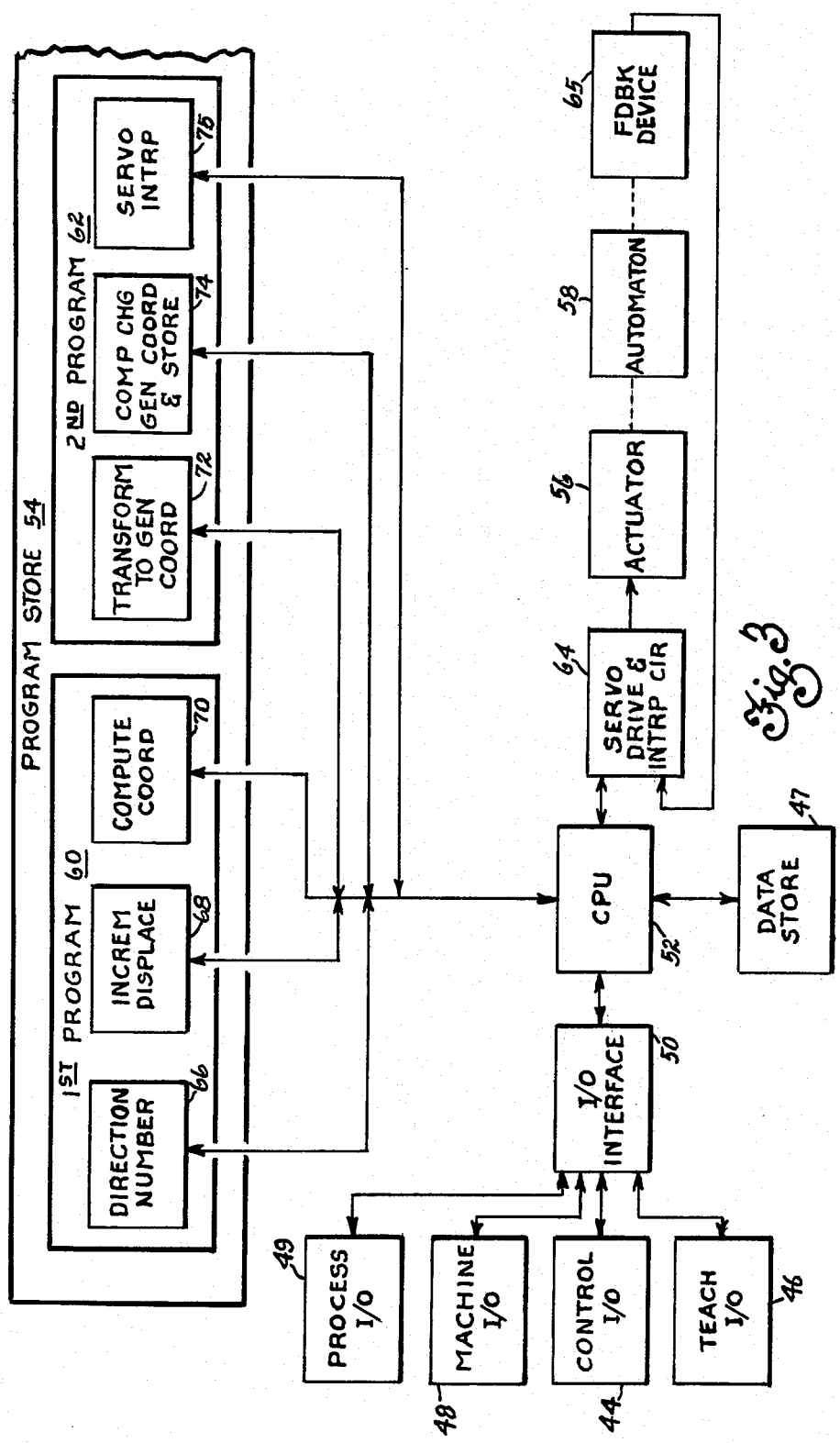
FIG. 3 is a detailed block diagram of a computer control for the automaton which is shown by general blocks.

FIG. 3 is a detailed block diagram of the control for the automaton with the automaton illustrated in block form. The console unit of FIG. 1 is comprised of a system control input-output device 44 and a teach input-output device 46. The system control input-output device 44 provides the operator with the necessary controls and displays to generally operate the automaton. The teach input-output device 46 provides the operator with the necessary controls and displays to teach the automaton a cycle of operation. The automaton may be taught by lead through or any other programming technique well-known in the art. Lead through is a method used in prior art devices which is applicable here. However, it should be noted that applicant's apparatus only requires the operator teach a predetermined path velocity and the position and orientation of the end points of each path in a cycle of operation. Upon defining the path velocity and the rectangular and angular coordinate values at the end points, they are stored as input signals in a data store 47. As will be appreciated by those who are skilled in the art, in teaching the automaton, the operator may be provided with any convenient coordinate system. However, applicant's disclosed embodiment requires that the rectangular and angular coordinate values be available in the data store 47. A machine input-output device 48 operates in conjunction with the CPU 52 in controlling the automaton. The machine input-output device 48 is primarily concerned with the machine oriented functions, e.g. limit switches, solenoids, pressure switches and other devices located on the automaton itself. Finally, a process input-output 49 is used to integrate the automaton into the process of which it is to be a part. For example, if the automaton is to operate with existing machines, there must be communication links between the automaton and the machines. The process input-output 49 provides these communications links. An input-output interface 50 is responsive to the input-output devices and provides a communication link between the input-output devices and a central processing unit (CPU) 52. Typical input-output devices and their corresponding interfaces are old in the art and will not be further discussed here.

After having received the input information, the CPU 52 operates with programs stored in the program store 54 for commanding the operation of the actuator mechanism 56 on the automaton 58. The program store 54 is a storage device for storing all the program required to operate the automaton. As indicated in FIG. 3, only a portion of the program store 54 is shown; and only those programs germane to the claimed apparatus are illustrated. The physical embodiment of the programs and routines will be a function of the program store itself. The program store 54 and also the data store 47 may be in the form of punched cards, magnetic cores or tape, discs, drums or any of the other storage mediums available in the art. The programmed stores are unique physical elements comprising sets of instruction which are defined by the flow charts illustrated in FIGS. 4 through 7. The CPU 52 operates in conjunction with a first program 60 and the input signals to provide a means for producing sets of first signals representing coordinate values of a number of points having a locus defining a predetermined path between the end points previously defined by the operator. The CPU 52 operates with a second program 62 and the sets of first signals to provide sets of second signals representing generalized coordinate values of the coordinate values above. Finally, a servomechanism drive and interfacing circuit 64 is responsive to the sets of control signals and feedback signals produced from feedback devices 65 located on the automaton for moving the automaton along the predetermined path.

The first and second programs 60 and 62, respectively, may be divided into a number of general subprograms or routines. The first major subprogram of the first program 60 is a direction number routine 66. The CPU 52 in combination with the direction number routine 66 is responsive to the input signals defining the programmed end points for producing direction number signals having a sign representing the direction of the desired automaton motion and a magnitude proportional to a coordinate component of the total path between the programmed end points. Next, an incremental displacement routine 68 operates with the CPU 52 in response to signals defining the end points and the predetermined path velocity for producing a plurality of signals representing incremental displacements along the predetermined path. This is accomplished in two parts. First, a number of distance parameters are calculated, e.g., for a fixed time increment, the number of iterations required to define the path between the programmed end points. Next, the displacement along the path during each iteration is calculated. Signals defining the changes in distance along the path are used with a coordinate routine 70, the direction number signals, and the CPU 52 for producing sets of first signals representing coordinate values of intermediate points defining the incremental displacement during each iteration. A first routine 72 in the second program 62 is used by the CPU 52 in response to the sets of first signals to produce sets of individual control signals representing the corresponding generalized coordinate values of the coordinate values. Next, a routine 74 is responsive to the sets of control signals and operates with the CPU 52 to calculate the change of the generalized coordinate values during each iteration. This change in the generalized coordinate values is then stored in a buffer store. A servo-interrupt routine 75 is responsive to an interrupt signal from the servomechanism drive and interfacing circuit 64 and operates with the CPU 52 to produce signals representing the change in the generalized coordinate values to the servomechanism drive and interfacing circuit 64. The circuit 64 is responsive to the signals from the CPU 52 and produces output signals to the actuators thereby causing the automaton to move along the predetermined path between the two programmed end points at the predetermined path velocity. It should be noted that the general configuration of elements in FIG. 3 comprised of input-output interface and drive circuits 50 and 64, respectively, stores 47 and 54, and CPU 52 define the typical elements in a general process control computer.

Figure 4:
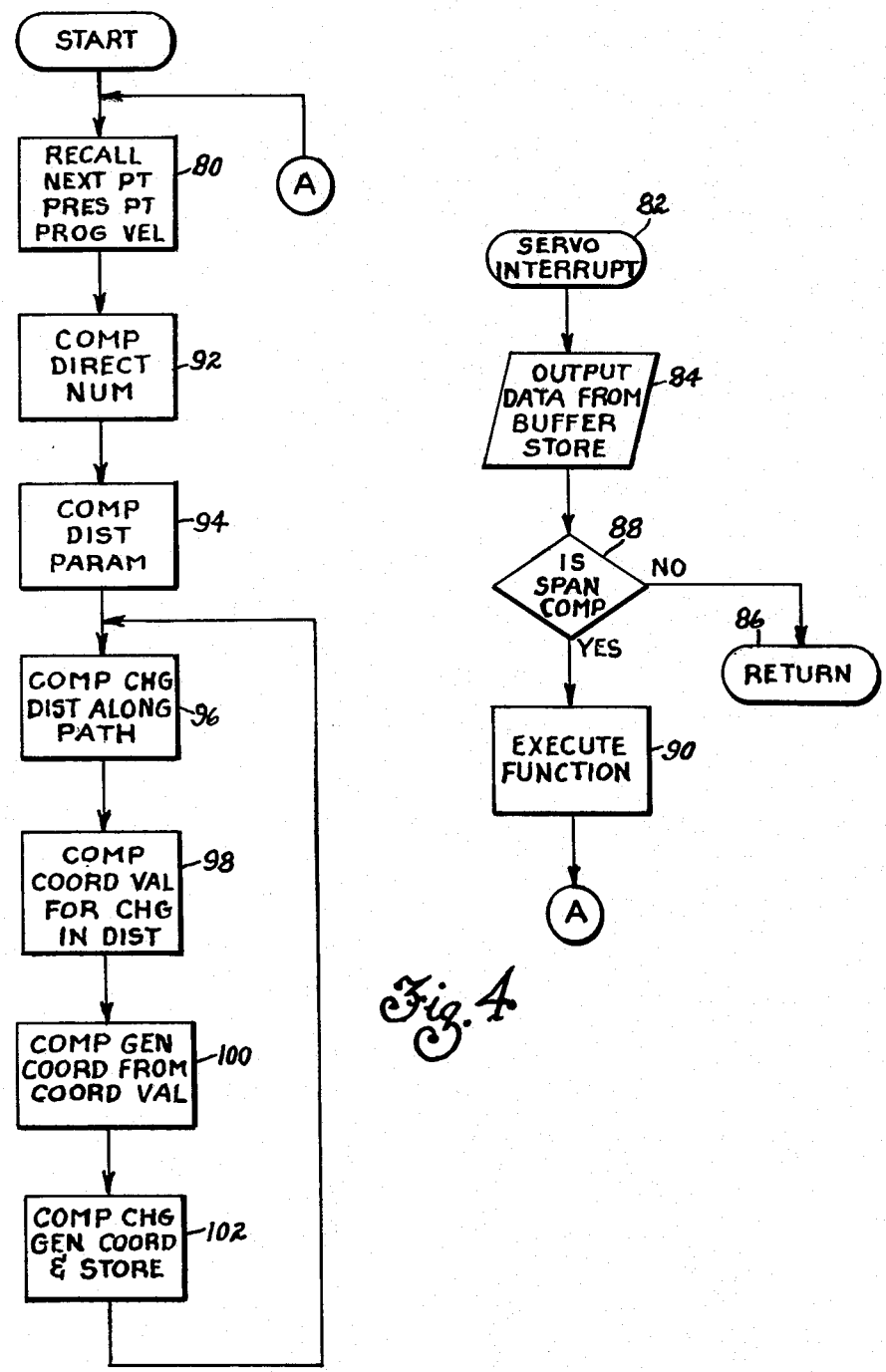
FIG. 4 is a flow chart illustrating applicant's method of control.

FIG. 4 illustrates the steps required to execute applicant's process. Process block 80 requires that the coordinate values at the predetermined end points and predetermined path velocity be recalled from storage. Next as shown in block 92, direction numbers are calculated. Each direction number has a sense representing the direction of motion and a magnitude proportional to a coordinate component of the path between the programmed end points. The sign of the direction number indicates the direction of the change along said axis. When the specification is referring specifically to the rectangular coordinate axes defining position, the term position direction number will be used to define these dimensions quantities. Further when the specification is referring specifically to the angles of orientation $m$ and $n$, the term generalized direction number will be used to distinguish these quantities from the dimensionless quantities. Generally, however, the term direction number refers to both the rectangular coordinate axes defining position as well as the angular axes of motion defining orientation.

In block 94, the distance parameters required to compute the path between the programmed end points are calculated. Process block 96 requires the computation of the change in distance along the path during each iteration. Next, the coordinate values defining position and orientation at an intermediate point for each change in distance are calculated in process block 98. This is accomplished by using the direction numbers. Therefore, the computation of the coordinate values of an intermediate point along the path during each iteration reqires the operations defined in process blocks 92, 94, 96 and 98. Next operation block 100 reqires the computation of generalized coordinate values corresponding to the coordinate values calculated in operation block 98. Finally, operation block 102 computes the change in the generalized coordinate values from the present point to the next point and stores these changes in a buffer store awaiting an interrupt from the servomechanism drive and interfacing circuit 64.

As is readily apparent to those who are skilled in the art, the process just described operates asynchronously with the servomechanism drive and interfacing circuit 64. The circuit 64 operates on a fixed time base sampling system. In other words, at fixed predetermined intervals of time, the servomechanism requests new information from the computer. By operating the servomechanism at a fixed sampling rate, the computer is provided with several advantages. For example, by knowing the length of the programmed path, the predermined path velocity and the fixed length of a sample time, the computer is able, in process block 94, to compute the number of iterations required to execute the programmed path. Consequently, with this information, the computer can then calculate the change in distance along the programmed path during each iteration. Further, as will be appreciated by those who are skilled in the art, the use of a fixed sampling rate permits the computer to execute many other functions in addition to generating the predetermined path. Because the computer is substantially faster than the peripheral devices attached to it, a backlog of information to be output therefrom is generated. Consequently, a system of interrupts each having a particular priority is used.

The purpose of the servo-interrupt routine defined in block 82 is to transfer data from the buffer store in response to an interrupt from the servomechanism drive and interfacing circuit 64. The interrupt may occur at any time during processing. When an interrupt does occur, the control of the process is transferred from the main program to the servo-interrupt routine 82. Within the servo-interrupt routine 82, process block 84 requires that the change in the generalized coordinate values be transferred from the buffer store to the servomechanism drive and interfacing circuit 64. Next in decision block 88, a check is made to see if the path between the two programmed end points is complete. If the path is not complete, the servo-interrupt routine returns control of the process back to the main program at the point where the interrupt occurred; and the process is continued. If the span is complete, process block 90 requires that some predetermined function be executed, after which, the process returns to block 80 to begin the next programmed path.

FIGS. 5a, 5b, 5c and 5d comprise a detailed flow chart of the process discussed in FIG. 4. Conversion of the flow chart in FIG. 5 into a coded computer program can be readily accomplished by one who is reasonably skilled in a programming language compatible with a general process control computer. Upon examining FIG. 5 and comparing it to the general flow chart shown in FIG. 4, one will discover that the majority of operations shown in FIGS. 5a through 5c can be classed under the general process step of computing distance parameters shown in operation block 94 of FIG. 4. The reason for this is the problem of determining whether or not a change of velocity is necessary; and further, the magnitude of said change in velocity.

Generally, a path between two programmed points may be divided into three separate spans. A first span may require an acceleration of deceleration depending upon the velocity upon entry into the span and the predetermined path velocity. A second span may be comprised of a constant velocity phase, and a third span may occur if a deceleration to a stop is required. Therefore, by examining the velocities at the end points of the programmed path, the computer is able to determine whether or not two or three velocity dependent spans are required. Once this determination is made, a further problem exists. If one knows the required velocities as well as the permissible change in velocity, the length of each velocity dependent span may be calculated. However, the situation may exist where the sum of the ideal velocity dependent spans exceeds the length of the path between the programmed end points. These particular cases have to be detected and handled on an individual basis. Consequently, one can readily see how the computation of distance parameters becomes a major problem. Further, the problem is not so much one of solution but in the process time required, to execute the necessary solutions.

Figure 5A:
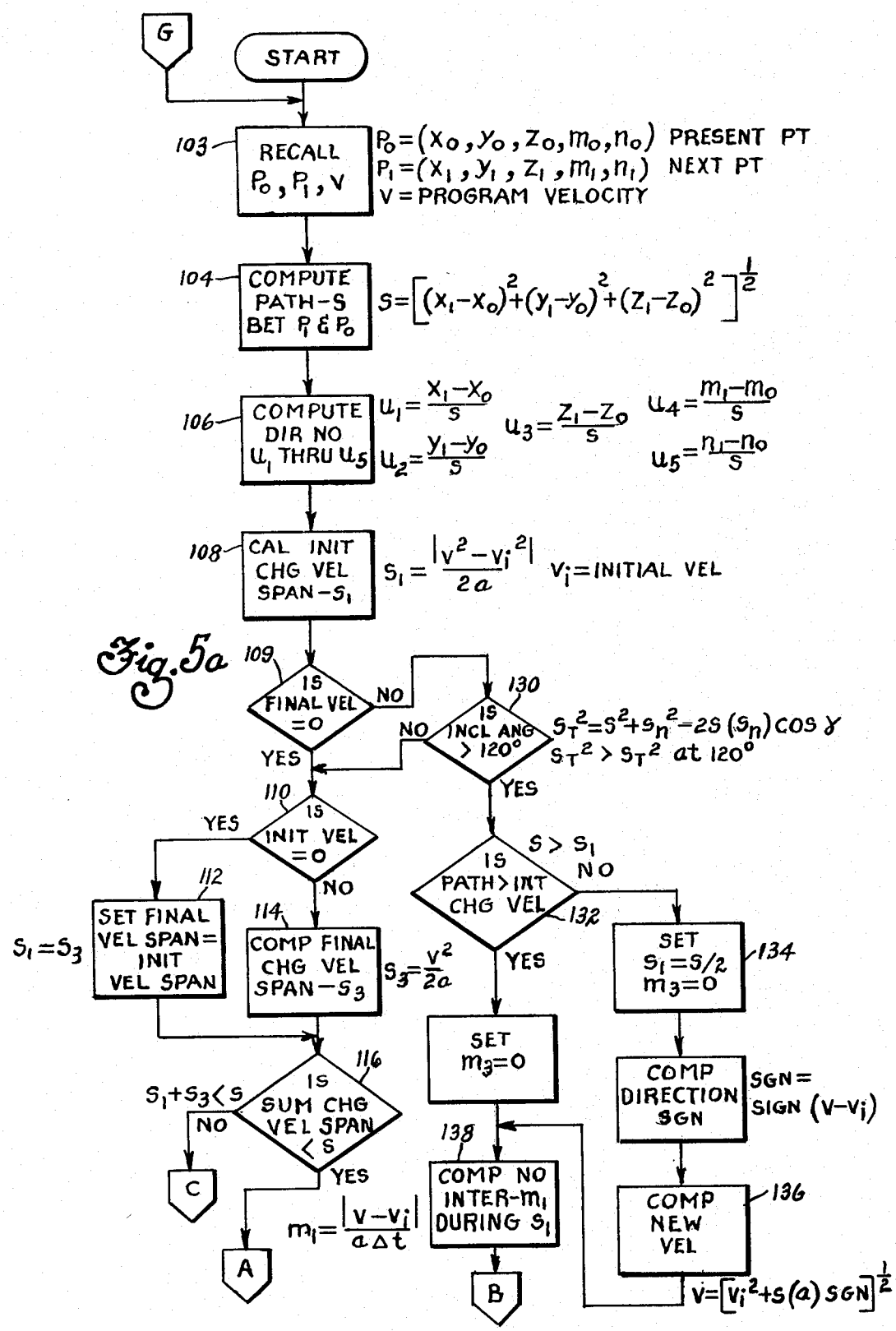
Figure 5B:
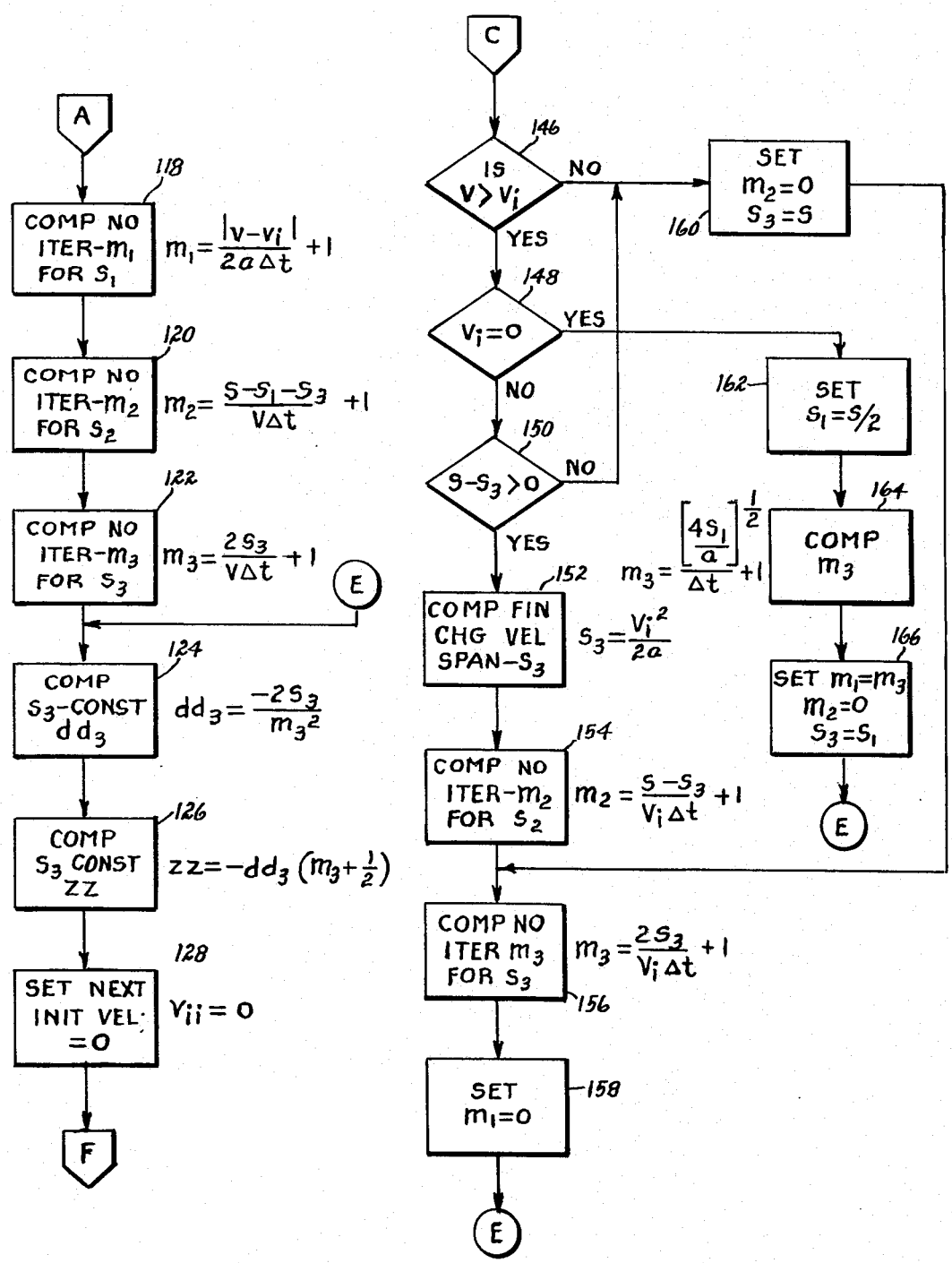
Figure 5C:
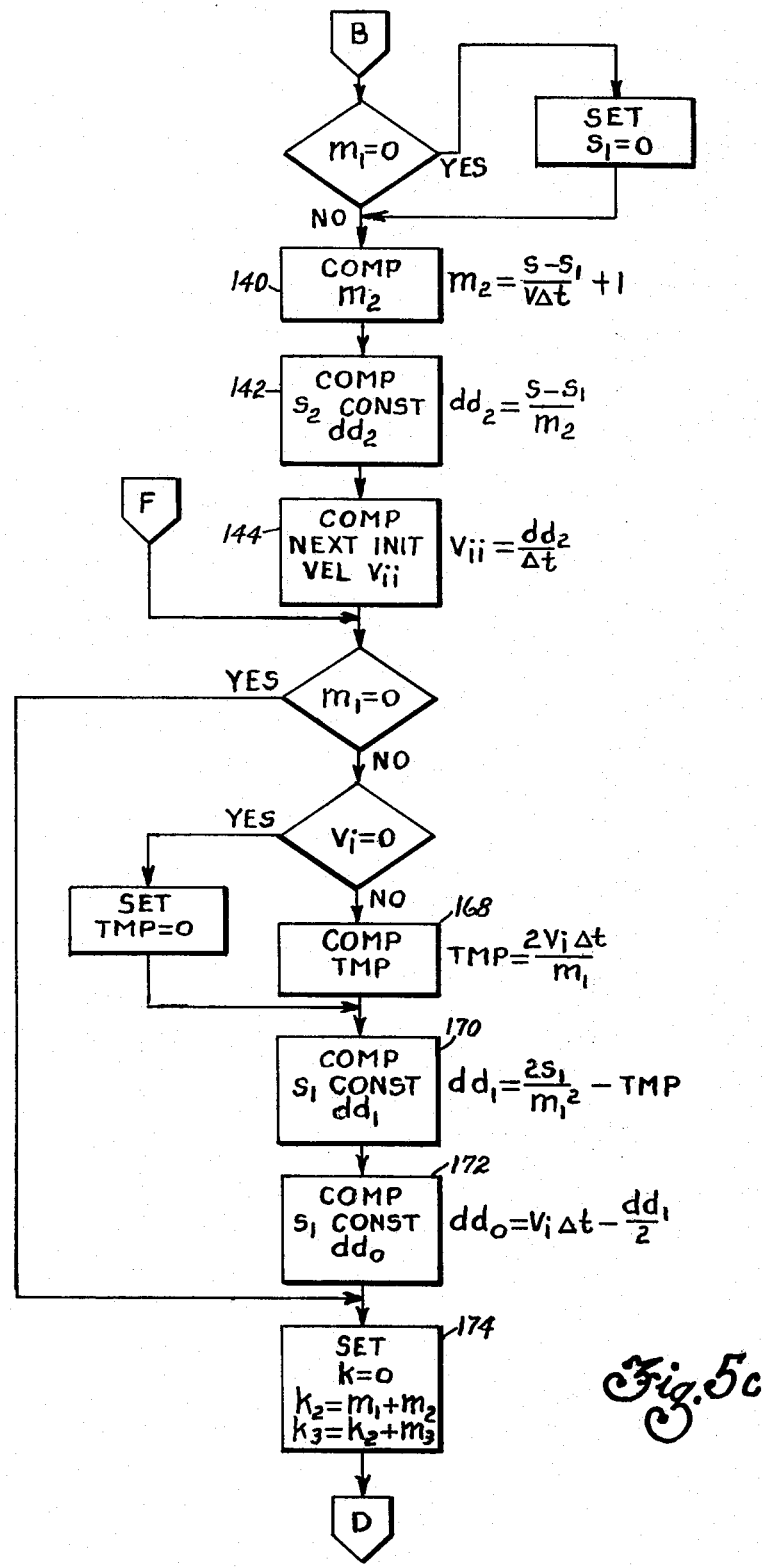

In FIG. 5a, the first step in the process is to recall and make available the coordinate values defining the position and orientation at the present point, the coordinate values at the next predetermined path point and the programmed velocity programmed therebetween. Next, process block 104 requires the computation of the length of the total path. After computing the direction numbers in process block 106, the length of the initial change in velocity span $s_1$ is calculated. Process block 109 is to determine whether or not the velocity at $P_1$ is zero. In other words, is there a stop between the execution of successive programmed paths or are the successive programmed paths executed in a continuous manner? If the final velocity is zero, the process checks to see if the initial velocity is zero via decision block 110. If the initial velocity and final velocity are both zero, operation block 112 sets the length of the final change in velocity span $s_3$ equal to the length of the initial change in velocity span $s_1$ calculated in process block 108. If the final velocity is zero, but the initial velocity is not zero, process block 114 is operative to compute the length of the final change in velocity span. At this point, decision block 116 makes a check to determine if the sum of the change in velocity spans computed thus far is less than the length of the programmed path. If the sum of the lengths of the change in velocity spans is less than the length of the programmed path, the process continues via the offpage connector A. It should be noted at this point that the length of the constant velocity span will be equal to the difference between the length of the total path and the length of the sum of the initial and final change in velocity spans. Offpage connector A continues in FIG. 5b. Knowing the lengths of each of the spans comprising the programmed path and the fixed time base of the sampling system, it is now possible to calculate the number of iterations required to execute each of the spans. These calculations are made by process blocks 118, 120 and 122. Next blocks 124, 126 and 128 are operative to calculate constants which are subsequently used in the process.

Returning to the decision block 109 in FIG. 5a, the determination that the final velocity is not zero means that the path moves continuously between successive program spans. Considering the dynamics of the automaton itself, this may or may not be physically possible depending on the change in direction or the included angle between successive paths. Applicant has arbitrarily chosen an included angle of 120° to be controlling in decision block 130. If the included angle between successive paths is greater than 120°, the successive paths are executed on a continuous basis. However, if the included angle is less than 120°, the process automatically inserts a stop point; and the successive paths are executed in a discontinuous manner. The Law of Cosines is used to determine if the included angle is greater or less than 120°. Next, decision block 132 determines if the length of the initial change in velocity span is less than the length of the programmed path. If $s_1$ is not less than the programmed path, process block 134 arbitrarily sets the length of the initial change in velocity span equal to ½ the length of the programmed path. Further, in process block 136 a new velocity is computed. It should be noted at this point that if successive program paths are to be executed continuously, by definition, there is no final change of velocity span $s_3$. Further, by definition, the number of iterations required to execute the final change in velocity span is equal to zero. If the length of the initial change in velocity span is less than the programmed path, the number of iterations required to execute the initial change in velocity span is computed in operation block 138. The offpage connector B is continued in FIG. 5c. In process blocks 140, 142 and 144, constants are computed which are used later in the process; and therefore, will not be discussed at this time.

Returning to FIG. 5a, the significance of the computation of distance parameters should be readily apparent to one who is reasonably skilled in the art. One special case has not been discussed in detail. This case arises with decision block 116 where the sum of the lengths of the initial and final change of velocity spans is not less than the length of the total path. In this case, offpage connector C takes us to FIG. 5b. Blocks 146 through 166 define another special case which is similar in solution to the other special cases described earlier in detail. Therefore, the process at this point will not be described in detail, and the disclosure contained in blocks 146 through 166 will be deemed sufficient. After execution, this portion of the process continues via onpage connector E to block 124. The process then follows offpage connector F to FIG. 5c. Again, process blocks 168 through 174 define constants which are used later in the process.

From offpage connector D, the process continues to FIG. 5d. Decision block 176 determines whether or not the initial change in velocity span is complete. If it is not, the process goes to block 178 which initiates the first iteration. The change in distance along the programmed path for each iteration in the first change of velocity span is determined by the formula associated with operation block 182. Generally, the formula indicates that a change in distance along the path for a present iteration is equal to the change in the distance along the path during the previous iteration plus some constant (calculated earlier). The problem arises in calculating the change in distance along the first change in velocity span during the first iteration. This is a special situation which is handled according to the formula associated with the process block 180. As the formula indicates, the length of the change in distance along the path during the first iteration is equal to one of the constants which was calculated earlier. After executing the first iteration all successive iterations are handled via process block 182 until the number of iterations $k$ is equal to the number of iterations calculated for the initial change in velocity span $m_1$. According to process block 184, the rectangular and angular coordinate values are computed for each change in distance along the path, or in other words, for each iteration. Further, process block 186 requires that these rectangular and angular coordinate values be transformed into corresponding generalized coordinate values. In process block 188, the change in the generalized coordinates along the programmed path are computed and stored to be ready for an interrupt from the servomechanism drive and interfacing circuit 64. The servo-interrupt routine was discussed in reference to FIG. 4, and further discussion at this time is not necessary.

When the number of iterations is equal to the number of interations computed for the initial change in velocity span, the process moves to decision block 190 which checks to see if the constant velocity span is complete. If the constant velocity span is not complete, the process executes blocks 192 through 200 in an iterative manner until the number of iterations is equal to the sum of the iterations required to execute the initial change in velocity span $m_1$ and the constant velocity span $m_2$. When this occurs, the process moves on to decision block 202, where the process determines whether or not the final change of velocity span is complete. In a situation where there is continuous movement between successive programmed paths, there is no final change in velocity span; and therefore, $k_2$ is equal to $k_3$. In this case, when the constant velocity span is complete, the process proceeds to the offpage connector G. However, if the motion between successive program paths is discontinuous, the final change in velocity span must be computed in an iterative manner similar to the other velocity dependent spans. Consequently, one can readily see how the process moves from a present point to a successive programmed point in an iterative fashion with all the appropriate velocity and change in velocity parameters. When the final change in velocity span is complete, the process moves via the offpage connector G back to FIG. 5a and to process block 103.

Figure 6A:
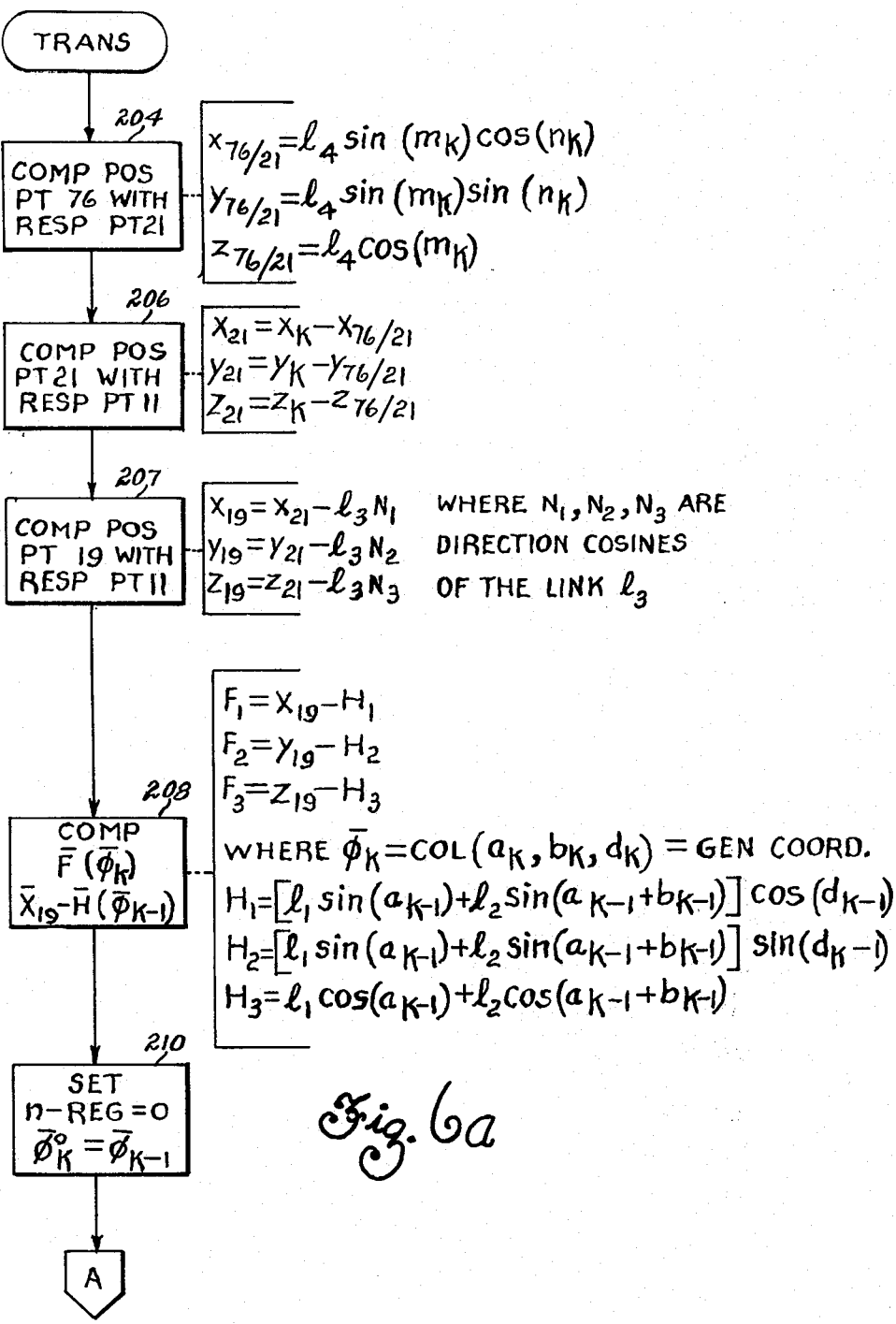
FIG. 6 is a detailed flow chart of a routine for transforming rectangular coordinate values into generalized coordinate values.
Figure 6B:
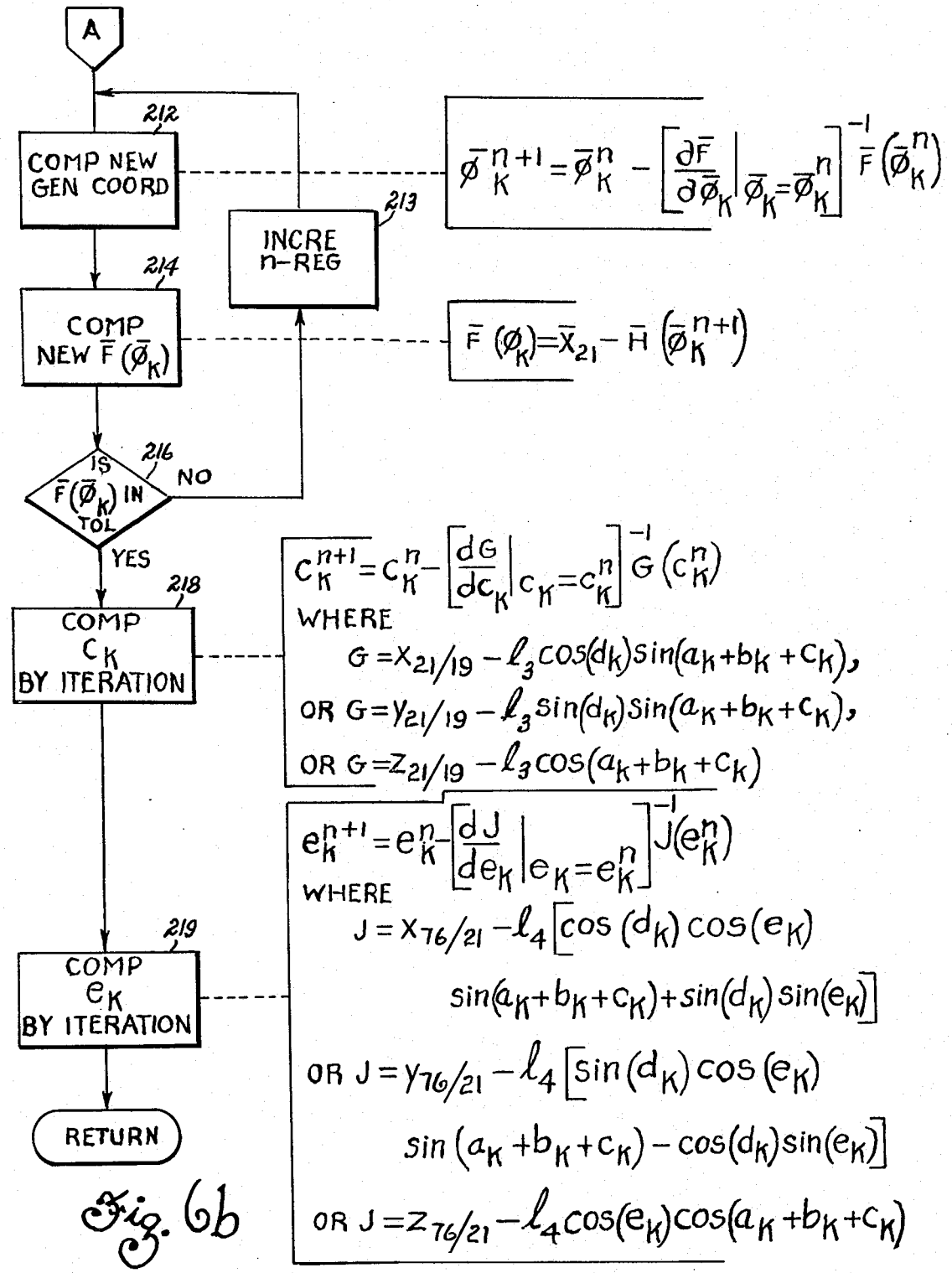

FIG. 6 is a detailed flow chart of a method for transforming the rectangular and angular coordinate values to the generalized coordinate values. There are several approaches to solve such a problem. The obvious approach is to write equations defining the generalized coordinates in terms of the rectangular and angular coordinates. Given the proper apparatus, these equations can be solved; and the transformations executed. Unfortunately,, these expression involve inverse trigonometric functions which are difficult to solve with applicant's system. Therefore, applicant has chosen a different approach. Applicant derived the inverse transformation equations. In other words, the expressions defining each of the rectangular and angular coordinates in terms of the generalized coordinates. These equations are then solved by a method of successive apporximations using the general Newton-Raphson method of solving non-linear equations. It should be remembered that applicant's use of the indirect transformation equations is arbitrary and should not be considered a limitation of applicant's invention. Likewise, applicant's choice of the Newton-Raphson method of solving the transformation equations is arbitrary, and any convenient method of solving non-linear equations may be used.

In applicant's system the rectantular and generalized coordinate systems are related by a set of transformation equations 1, 2, and 3, and a set of constraint equations 4, 5 and 6 representing orientation constraints on the function element 34, as indicated below:

1. $x = cos(d) [1_1 sin(a)+1_2 sin(a+b)+1_3 sin(a+b+c)]$ $+1_4[cos(d)cos(e)sin(a+b+c)-sin(d)sin(e)]$
2. $y = sin(d)[1_1 sin(a)+1_2 sin(a+b)+1_3 sin(a+b+c)]$ $+1_4[sin(d)cos(e)sin(a+b+c)+cos(d)sin(e)]$
3. $z = 1_1 cos(a)+1_2 cos(a+b)+1_3 cos(a+b+c)+1_4 cos(e)\cdot cos(a+b+c)$ and
4. $1_4 cos(n)sin(m) = 1_4[cos(d)cos(e)sin(a+b+\lambda c)-sin(d)sin(e)]$
5. $1_4 sin(n)sin(m) = 1_4[sin(d)cos(e)sin(a+b+c)+cos(d)sin(e)]$
6. $1_4 cos(m) = 1_4 cos(e)cos(a+b+c)$ From the above equations one can readily see that there are six equations and five unknowns. The method of solving these equations is somewhat arbitrary; however, because of limitations within his computer, applicant has chosen a particular technique as described below.

Given the rectangular and angular coordinates $(x_k y_k z_k m_k n)$, if the rectangular coordinates of the point 19 with respect to the origin can be determined, the first two terms of equations 1, 2 and 3, which represent the coordinate transformations of the point 19, can be solved simultaneously to determine the generalized coordinates $a_k$, $b_k$ and $d_k$. Next, using the above solution, the rectangular coordinates of the point 21 with respect to point 19, and the third term of equations 1, 2 and 3, the generalized coordinate $c_k$ may be determined. Finally using the solutions for the generalized coordinates $a_k$, $b_k$, $c_k$, and $d_k$, and equations 4, 5 and 6, the generalized coordinate $e_k$ may be determined.

Therefore, as indicated in block 204, by substituting the calculated angular coordinate values $m_k$ and $n_k$ for the values of $m$ and $n$, the coordinates of the point 76 with respect to the point 21 can be determined. Next, as indicated in block 206, the coordinate values of the point 21 are determined. As indicated in block 207, the coordinate values of the point 19 are determined. This is accomplished by substracting the coordinate values of the point 21 with respect to the point 19 from the coordinate values of the point 21. The rectangular coordinate values of the point 21 with respect to point 19 are determined by multiplying the length of the element $1_3$ between said points by constants representing the direction cosines of said element.

The problem now is how does one solve for the generalized coordinate values in the first two terms of the first three transformation equations. As indicated earlier, although there are several techniques available, applicant has chosen the Newton-Raphson method of solution. As indicated by block 208, applicant has defined new functions $H_1$, $H_2$, and $H_3$ corresponding to the first two terms of equations 1, 2 and 3, and representing the coordinate transformations of the point 19. Further, an error function is defined representing the difference between the known terms $x_{19}$, $y_{19}$, and $z_{19}$, and the unknown terms $H_1$, $H_2$, and $H_3$. Generally, the first step of the solution is to assume a value for the generalized coordinate values of the unknown terms and then solve the error function. The value of the error function and the assumed generalized coordinate values are used with the Newton-Raphson solution to find a new value for the generalized coordinates. Next, using the new generalized coordinate values, a new error function is computed. If a solution of the new error function is zero, or less than a predetermined tolerance, the calculated values of the generalized coordinates are deemed to be correct. If the value of the new error function is not within tolerance, the Newton-Raphson solution is again used to determined a further set of generalized coordinate values, which in turn, define a further value for the error function. The process continues until the error function is driven to less than the predetermined tolerance.

As indicated by the annotation to process block 208, applicant has chosen to use the generalized coordinate values of the previous point as the first assumption is solving for the value of the unknown terms in the functions $H_1$, $H_2$, and $H_3$. Next after setting an indexing register equal to zero as required in process block 210, process block 212 requires a computation of a new set of generalized coordinate values using the error function computed in process block 208.

This process continues until the decision block 216 finds the error function to be within tolerance. When this occurs, the most recently calculated values of generalized coordinate values are defined as the angles $a_k$, $b_k$, and $d_k$ which define the position of the point 19 corresponding to the rectangular coordinate values computed in process block 207. The magnitude of the angles $a_k$, $b_k$, and $d_k$ represent a first set of generalized coordinate values describing the location of the function element in space.

The process then continues to block 218 where the generalized coordinate $c_k$ is computed. Again, applicant has chosen to use the Newton-Raphson method of solution. Therefore, it is understood that block 218 includes the steps of the Newton-Raphson solution as defined earlier in process blocks 208 through 216. An error function G is defined as the difference between the rectangular coordinate values of the point 21 with respect to the point 19 and the corresponding coordinate transformations represented by the third term of equations 1, 2 and 3. One further point should be noted with regard to this solution. Although there is only one unknown to be determined, three error equations are required. During the iteration process of the Newton-Raphson solution, the sine and cosine values may go to zero; therefore, the computer may be instructed to divide by zero. The problem is eliminated by performing a test on the error functions in order to select an error function whose derivative does not approach zero.

As indicated in block 219, the final generalized coordinate $e_k$ is determined. Again, applicant has chosen to use the Newton-Raphson method of solution; and therefore, it is understood that block 219 includes the general steps of the solution as indicated in process blocks 208 through 216. Further, the error function J represents the difference between the rectangular coordinate values of the point 76 with respect to the point 21 and the corresponding coordinate transformations represented by the last term of equations 1, 2 and 3. As described above, these error functions are tested; and one is chosen which does not have a zero value derivative. After the values of the generalized coordinates $a_k$, $b_k$, $c_k$, $d_k$ and $e_k$ have been determined, they are stored and used as the assumed coordinate values for transforming the next set of calculated rectangular and angular coordinate values.

In FIG. 7, after the generalized coordinate values have been computed as described with reference to FIGS. 6, each coordinate value is checked by process block 220 to determine if it exceeds a predetermined maximum or minimum coordinate value. If the coordinate is not within the predetermined boundary, block 222 requires the generalized coordinate value be set equal to the boundary value. Next according to block 224, the change in the angle of the generalized coordinate is computed. This is accomplished by subtracting the new coordinate value from the previous coordinate value. The change in the generalized coordinate value is then stored as required in block 226. Process block 228 determines if all the new generalized coordinates displacements have been computed and stored. If not, the process returns to block 220 and begins again. After all the generalized coordinate changes have been calculated and stored, block 230 determines if these new values can be transferred to a buffer store. As described in FIG. 4, when an interrupt occurs, data is transferred from the buffer store to the servomechanism drive and interfacing circuit 64; therefore, after an interrupt, process block 232 requires that the change in the generalized coordinate values be transferred to the buffer store.

While the invention has been illustrated in some detail according to the preferred embodiments showed in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for controlling an element of a machine in response to input signals representing a predetermined path velocity between and first coordinate values relative to a first coordinate system of two predetermined points being connected by a predetermined path generated by said apparatus, said machine having a geometric configuration defining a generalized coordinate system independent of said first coordinate system, and said machine having a plurality of actuators with at least one of said actuators defining an axis of rotation affecting the position of the element, the apparatus comprising:

a. means for storing the input signals;
   b. means responsive to the input signals representing first coordinate values of and a predetermined path velocity between two of the predetermined points for producing displacement signals, each displacement signal representing an incremental displacement along a predetermined path between the two predetermined points;
   c. means responsive to the input signals and the displacement signals for producing sets of first signals representing first coordinate values relative to the first coordinate system of end points of the incremental displacements;
   d. means responsive to the sets of first signals for generating sets of individual control signals representing generalized coordinate values relative to the generalized coordinate system of the end points; and
   e. means responsive to the sets of individual control signals for operating the actuators in a coordinated manner at the predetermined velocity along the predetermined path between the two predetermined points.

2. An apparatus for controlling an element of a machine in response to input signals representing predetermined path velocities between and first coordinate values relative to a first coordinate system of predetermined points being connected by predetermined paths generated by said apparatus, said machine having a geometric configuration defining a generalized coordinate system independent of said first coordinate system, and said machine having a plurality of actuators with at least one of said actuators defining an axis of rotation affecting the position of the element, the apparatus comprising:
a. means for storing the input signals;
b. means responsive to the input signals for producing sets of displacement signals, each set of displacement signals representing incremental displacements along a predetermined path connecting two of the predetermined points;
c. means responsive to the sets of displacement signals for producing a plurality of sets of first signals, said sets of first signals representing sets of first coordinate values relative to the first coordinate system of end points of the incremental displacements;
d. means responsive to the plurality of sets of first signals for generating a plurality of sets of individual control signals, said sets of individual control signals representing sets of generalized coordinate values relative to the generalized coordinate system of the end points; and
e. means responsive to the plurality of sets of individual control signals for operating the actuators in a coordinated manner to move the element of the machine at the predetermined path velocities along the predetermined paths connecting the predetermined points.

3. An apparatus for controlling an element of a machine in response to input signals representing a predetermined path velocity between and first coordinate values relative to a first coordinate system of two predetermined points being connected by a predetermined path generated by said apparatus, said machine having a plurality of actuators with at least one of said actuators defining an axis of rotation affecting the position of the element, and said machine havng a geometric configuration defining a generalized coordinate system independent of said first coordinate system, the apparatus comprising:
a. means for storing the input signals;
b. means responsive to the input signals for producing displacement signals, each displacement signal representing an incremental displacement along the predetermined path between the two predetermined points;
c. means responsive to the input signals for producing direction number signals, each direction number signal having a magnitude representing the displacement along a coordinate component relative to the first coordinate system of the predetermined path between the two predetermined points and a sense representing the direction along said coordinate component;
d. means responsive to the direction number signals and the displacement signals for producing sets of first signals representing first coordinate values relative to the first coordinate system of end points of the incremental displacements;
e. means responsive to the sets of first signals for generating sets of individual control signals representing generalized coordinate values relative to the generalized coordinate system of the end points; and
f. means responsive to the sets of individual control signals for operating the actuators in a coordinated manner to move the element of the machine at the predetermined path velocity along the predetermined path between the two predetermined points.

4. The apparatus of claim 3, wherein the means for producing the sets of first signals further comprises means for adding to a known first coordinate value a product produced by multiplying the magnitude of an incremental displacement by an appropriate direction number thereby producing coordinate values relative to the first coordinate system of an end point of an incremental displacement.

5. An apparatus for controlling an element of a machine in response to input signals representing a predetermined path velocity between and first coordinate values relative to a first coordinate system of two predetermined points being connected by a predetermined path generated by the apparatus, said machine having a geometric configuration defining a generalized coordinate system independent of said first coordinate system, and said machine having a plurality of actuators with at least one of said actuators defining an axis of rotation affecting the position of the element, the apparatus comprising:
a. means for storing the input signals;
b. means responsive to the input signals for producing a displacement signal representing an incremental displacement during a fixed time interval along the predetermined path connecting the two predetermined points;
c. means responsive to the input signals and the displacement signal for producing a set of first signals representing a set of first coordinate values relative to the first coordinate system of an end point of the incremental displacement;
d. means responsive to the set of first signals for generating a set of individual control signals representing a set of generalized coordinates values relative to the generalized coordinate system of the end point;
e. means responsive to the set of individual control signals during the fixed time interval for operating the actuators in a coordinated manner to move the element to the end point at the predetermined path velocity; and
f. means for iterating the operation of means b through e to move the element at the predetermined path velocity along the predetermined path connecting the two predetermined points.

6. The apparatus of claim 5, wherein the means for producing the displacement signal further comprises:
a. means for generating an initial velocity signal representing an initial velocity of the element;
b. means responsive to the input signals, and the initial velocity signal for producing an iteration signal representing the number of iterations required to move along the predetermined path between the two predetermined points; and
c. means responsive to the input signals, the initial velocity signal and the iteration signal for producing the displacement signal representing the incremental displacement to be moved with each iteration.

7. The apparatus of claim 6, wherein the means for producing a set of first signals further comprises:

a. means for producing direction number signals in response to the first coordinate values of the two predetermined points, each direction number signal representing the magnitude and direction of motion along a coordinate component relative to the first coordinate system of the predetermined path between the two predetermined points; and b. means responsive to the direction number signals and the displacement signal for producing the set of first signals representing the set of first coordinate values of the end point, each coordinate value being determined by adding to a known coordinate value a product produced by multiplying the magnitude of the incremental displacement by a direction number signal.

8. An apparatus for controlling an element of a machine in response to a program comprised of input signals representing a predetermined path velocity between and rectangular and angular coordinate values of two predetermined points being connected by a predetermined path generated by the apparatus, said machine having a plurality of actuators with at least one of said actuators defining an axis of rotation affecting the position of the element and said machine having a geometric configuraton defining a generalized coordinate system, the apparatus comprising:

a. means for storing the input signals;

b. means responsive to the input signals for producing displacement signals, each displacement signal representing an incremental displacement along the predetermined path between the two predetermined points;

c. means responsive to the input signals for producing
  1. position direction number signals, each position direction number signal having a magnitude representing the magnitude of a positioning motion along a rectangular coordinate component of the predetermined path between the two predetermined points, and a sense representing the direction of motion along said rectangular coordinate component, and
  2. generalized direction number signals, each generalized motion of an angular coordinate component along the predetermined path between the two predetermined points, and a sense representing the direction of motion of the angular coordinate component;

d. means responsive to the position direction number signals, the generalized direction number signals and the displacement signals for producing sets of first signals representing rectangular and angular coordinate values of points defining the incremental displacements, said rectangular coordinate values being determined by adding to a known rectangular coordinate value a product produced by multiplying the magnitude of an incremental displacement by a position direction number signal, and the angular coordinate values being determined by adding to a known angular coordinate value a product produced by multiplying the magnitude of the incremental displacement by a generalized direction number signal;

e. means responsive to the sets of first signals for generating sets of individual control signals representing generalized coordinate values of the points defining the displacements; and f. means responsive to the sets of individual control signals for energizing the actuators to move the element of the machine at the predetermined path velocity along the predetermined path.

9. An apparatus for controlling the position of an element of a machine in response to a program comprised of input signals representing a predetermined path velocity between and first coordinate values relative to a first coordinate system of two predetermined points being connected by a predetermined path generated by the apparatus, said machine having a plurality of actuators defining a plurality of axes of motion with at least one of said actuators defining an axis of rotation affecting the position of the element, and said apparatus being responsive to the input signals for controlling the machine in relation to a generalized coordinate system independent of the first coordinate system and defined by the geometric configuration of the machine, the apparatus comprising:

a. means for storing the input signals;

b. means responsive to the input signals for generating sets of first signals representing sets of intermediate coordinate values relative to the first coordinate system of intermediate points having a locus defining the predetermined path between the two predetermined points;

c. means responsive to the sets of first signals for producing sets of error signals, each set of error signals representing the difference between each set of intermediate coordinate values and a set of initial coordinate values in the first coordinate system;

d. means responsive to the sets of first signals and the producing means for reducing the magnitude of the error signals below a predetermined magnitude by generating sets of individual control signals, each set of individual control signals representing a set of generalized coordinate values relative to the generalized coordinate system of the intermediate points; and e. means responsive to the sets of individual control signals for controlling the actuators to move the element of the machine along the predetermined path between the two predetermined points at the predetermined path velocity.

10. The apparatus of claim 9, wherein the producing means comprises:

a. means for producing sets of initial signals as a function of sets of assumed coordinate values in the generalized coordinates system, each set of initial signals representing a set of initial coordinate values in the first coordinate system; and b. means responsive to the sets of initial signals and the sets of first signals for producing the sets of error signals, each set of error signals representing the difference between a set of intermediate values and a set of initial coordinate values in the first coordinate system.

11. The apparatus of claim 10, wherein the reducing means comprises:

a. means responsive to the sets of error signals and a set of previously determined coordinate values in the generalized coordinate system for generating sets of individual control signals representing sets of new generalized coordinate values;

b. means responsive to the sets of individual control signals for producing sets of new signals, each set of new signals representing a set of new coordinate values in the first coordinate system;

c. means responsive to the sets of first signals and the sets of new signals for producing sets of new error signals, each set of new error signals representing the difference between a set of intermediate coordinate values and a set of new coordinate values;

d. means responsive to the sets of new error signals for comparing the magnitude of each new error signal to a predetermined magnitude; and e. means for iterating the operation of means a through d to reduce the magnitude of the error signals below the predetermined magnitude.

12. A computer system having stored in its memory sets of programmed instructions for moving an element of a machine along straight line paths in response to a stored program comprised of input signals representing predetermined path velocities between and rectangular coordinate values of a number of predetermined points being connected by said straight line paths, said machine having a geometric configuration defining a generalized coordinate system, and said machine having a plurality of actuators with at least one of said actuators defining an axis of rotation affecting the position of the element, the computer system comprising:

a. a data storage circuit for storing the program comprised of the input signals representing the path velocities between and the rectangular coordinate values of the predetermined points;

b. a central processing unit connected to the data storage circuit;

c. a first program storage means connected to the central processing unit and operating in conjunction therewith for producing a plurality of sets of first signals, said sets of first signals representing rectangular coordinate values of a plurality of points having a locus defining a straight line path between two of the predetermined points;

d. a second program storage means connected to the central processing unit and operating in conjunction therewith for producing a plurality of sets of individual control signals, said sets of individual control signals representing generalized coordinate values relative to the generalized coordinate system of the plurality of points; and e. a servomechanism drive and interfacing circuit responsive to the plurality of sets of individual control signals for causing the actuators to move the element of the machine at the predetermined path velocities along the straight line paths connecting the predetermined points.

13. The apparatus of claim 12, wherein the first program storage means comprises:

a. direction number program instructions for producing in response to the input signals sets of direction number signals, each set of direction number signals representing the magnitude and direction of motion along rectangular coordinate components of a straight line path;

b. incremental displacement program instructions for producing sets of displacement signals in response to input signals representing the predetermined path velocities, each set of displacement signals representing incremental displacements during fixed time intervals along a straight line path; and c. coordinate computation program instructions for producing, in response to the sets of direction number signals and displacement signals, the plurality of sets of first signals, each set of first signals representing rectangular coordinate values of an end point of an incremental displacement, and the sets of first signals representing a plurality of end points having a locus defining a straight line path.

14. The apparatus of claim 13, wherein the second program storage means comprises:

a. program instructions for producing, in response to the plurality of sets of first signals, the plurality of sets of individual control signals, said sets of individual control signals representing the generalized coordinate values of the plurality of points;

b. program instructions responsive to the plurality of sets of individual control signals for producing and storing a plurality of sets of output signals, said sets of output signals representing changes in the values of the generalized coordinates during the fixed time intervals; and c. servo-interrupt program instructions for transferring the plurality of sets output signals to the servomechanism drive and interfacing circuit in response to an interrupt signals from the servomechanism drive and interfacing circuit.

15. A method for operating a controller generating signals to a servomechanism circuit of a machine to control an element thereof in response to a program comprised of input signals representing a predetermined path velocity between and first coordinate values relative to a first coordinate system of two predetermined points being connected by a predetermined path generated by said controller, said machine having a geometric configuration defining a generalized coordinate system independent of said first coordinate system, and said machine having a plurality of actuators with at least one of said actuators defining an axis of rotation affecting the position of the element, the method to be executed by the controller comprising the steps of:

a. storing the input signals;

b. computing, in response to the input signals, first coordinate values relative to the first coordinate system of an intermediate point along the predetermined path between the two predetermined points;

c. generating, in response to the first coordinate values of the intermediate point, individual control signals representing generalized coordinate values of the intermediate point;

d. applying the individual control signals to the servomechanism circuit to cause the actuators to move the element of the machine to the intermediate point; and e. iterating steps (b) through (d) to cause the element to move at the predetermined path velocity along the predetermined path between the two predetermined points.

16. A method for operating a controller generating signals to a servomechanism circuit of a machine to control an element thereof in response to a program comprised of input signals representing predetermined path velocities between and first coordinate values relative to a first coordinate system of predetermined points being connected by predetermined paths generated by the apparatus, said machine having a geometric configuration defining a generalized coordinate system independent of said first coordinate system, and said machine having a plurality of actuators with at least one of said actuators defining an axis of rotation affecting the position of the element, the method to be executed by the controller comprising the step of:
a. storing the input signals;
b. computing, in response to input signals representing a predetermined path velocity between and first coordinate values of two of the predetermined points, first coordinate values relative to the first coordinate system of an intermediate point along a predetermined path connecting the two predetermined points;
c. generating, in response to the first coordinate values of the intermediate point, individual control signals representing generalized coordinate values of the intermediate point;
d. applying the individual control signals to the servomechanism circuit to cause the actuators to move the element of the machine to the intermediate point;
e. iterating steps (b) through (d) to cause the element to move at the predetermined path velocity along the predetermined path connecting the two predetermined points; and
f. iterating steps (b) through (e) to cause the element to move at the predetermined path velocities along the predetermined paths connecting the predetermined points.

17. A method for operating a controller generating signals to a servomechanism circuit of a machine to control an element thereof in response to a program comprised of input signals representing a predetermined path velocity between and first coordinate values relative to a first coordinate system of two predetermined points being connected by a predetermined path generated by said controller, said machine having a geometric configuration defining a generalized coordinate system independent of said first coordinate system, and said machine having a plurality of actuators with at least one of said actuators defining an axis of rotation affecting the position of the element, the method to be executed by the controller comprising the steps of:
a. storing the input signals;
b. computing, in response to the input signals, the magnitude of an incremental displacement along the predetermined path between the two predetermined points;
c. computing first coordinate values relative to the first coordinate system of an end point of the incremental displacement in response to the magnitude of the incremental displacement;
d. generating, in response to the first coordinate values of the end point, individual control signals representing generalized coordinate values relative to the generalized coordinate system of the end point of the incremental displacement;
e. applying the individual control signals to the servomechanism circuit to cause the actuators to move the element of the machine through the incremental displacement; and
f. iterating steps (b) through (e) to cause the element of the machine to move at the predetermined path velocity along the predetermined path between the two predetermined points.

18. A method for operating a controller generating signals to a servomechanism circuit of a machine to control an element thereof in response to a program comprised of input signals representing predetermined path velocities between and first coordinate values relative to a first coordinate system of predetermined points being connected by predetermined paths generated by said controller, said machine having a geometric configuration defining a generalized coordinate system independent of said first coordinate system, and said machine having a plurality of actuators with at least one of said actuators defining an axis of rotation affecting the position of the element, the method to be executed by the controller comprising the steps of:
a. storing the input signals;
b. computing, in response to input signals representing a predetermined path velocity between and first coordinate values of two of the predetermined points, the magnitude of an incremental displacement during a fixed time interval along a predetermined path between the two predetermined points;
c. computing first coordinate values relative to the first coordinate system of an end point of the incremental displacement in response to the magnitude of said incremental displacement;
d. generating, in response to the first coordinate values of the end point, individual control signals representing generalized coordinate values relative to the generalized coordinate system of the end point;
e. applying, during the fixed time interval, the individual control signals to the servomechanism circuit to cause the actuators to move the element of the machine through the incremental displacement;
f. iterating steps (b) through (e) to cause the element of the machine to move at the predetermined path velocity along the predetermined path between the two predetermined points; and
g. iterating the steps (b) through (f) to cause the element of the machine to move at the predetermined path velocities along the predetermined paths connecting the predetermined points.

19. The method of claim 7, wherein the step of computing the incremental displacement further comprises the steps of:
a. generating for each fixed time interval and in response to the input signals a velocity signal representing an initial velocity of the element; and
b. determining in response to the input signals and the velocity signal the number of incremental displacements between the two predetermined points as a function of the difference between the initial velocity and the predetermined path velocity.

20. A method for operating a controller generating signals to a servomechanism circuit of a machine to control an element thereof in response to a program comprised of input signals representing a predetermined path velocity between and first coordinate values relative to a first coordinate system of two predetermined points being connected by a predetermined path generated by said controller, said machine having a geometric configuration defining a generalized coordinate system independent of said first coordinate system, and said machine having a plurality of actuators with at least one of said actuators defining an axis of rotation affecting the position of the element, the method to be executed by the controller comprising the steps of:
a. storing the input signals;
b. computing direction numbers in response to the input signals, each direction number having a magnitude representing the magnitude of motion along a coordinate component relative to the first coordinate system of the predetermined path between the two predetermined points, and a sense representing the direction along the coordinate component;
c. computing in response to the input signals the magnitude of the incremental displacement along the path;
d. computing first coordinate values relative to the first coordinate system of an end point of the incremental displacement in response to the magnitude of the incremental displacement and the direction numbers;
e. producing individual control signals representing generalized coordinate values relative to the generalized coordinate system corresponding to the first coordinate values of the end point of the incremental displacement;
f. applying the individual control signals to the servomechanism circuit to cause the actuators to move the element of the machine through the incremental displacement; and
g. iterating steps (c) through (f) to cause the element to move at the predetermined path velocity along the predetermined path between the two predetermined points.

21. A method for operating a controller generating signals to a servomechanism circuit of a machine to control an element thereof in response to a program comprised of input signals representing a predetermined path velocity between and rectangular and angular coordinate values of two predetermined points being connected by a predetermined path generated by the controller, said machine having a geometric configuration defining a generalized coordinate system and having a plurality of actuators with at least one of said actuators defining an axis of rotation affecting the position of the element, the method to be executed by the controller comprising the steps of:
a. storing the input signals;
b. computing in response to the inputs signals
 1. position direction numbers, each position direction number having a magnitude representing the magnitude of a positioning motion along a rectangular coordinate component of the predetermined path between the two predetermined points, and a sense representing the direction of motion along said rectangular coordinate component, and
 2. generalized direction numbers, each generalized direction number having a magnitude representing the magnitude of motion of an angular coordinate component along the predetermined path between the two predetermined points, and a sense representing the direction of motion of the angular component;
c. computing in response to the input signals the magnitude of an incremental displacement along the path;
d. computing rectangular coordinate values of an end point of the incremtnal displacement in response to the magnitude of the incremental displacement and the position direction numbers;
e. computing angular coordinate values of the end point of the incremental displacement in response to the magnitude of the incremental displacement and the generalized direction numbers;
f. producing individual control signals representing generalized coordinate values relative to the generalized coordinate system corresponding to the rectangular and angular coordinate values of the end point of the incremental displacement;
g. applying the individual control signals to the servomechanism circuit to cause the actuators to move the element of the machine through the incremental displacement; and
h. iterating steps (c) through (g) to cause the element to move at the predetermined path velocity along the predetermined path between the two predetermined points.

22. The method of claim 21, wherein the step of computing the rectangular coordinate values of the end point of the incremental displacement further comprises the step of adding to a known rectangular coordinate value a product produced by multiplying the magnitude of the incremental displacement by a position direction number signal.

23. The method of claim 22, wherein the step of computing the angular coordinate values of the end point of the incremental displacement further comprises the step of adding to a known angular coordinate value a product produced by multiplying the magnitude of the incremental displacement by a generalized direction number.

24. A method for operating a controller generating signals to a servomechanism circuit of a machine to control an element thereof in response to a program comprised of input signals representing a predetermined path velocity between and first coordinate values relative to a first coordinate system of two predetermined points being connected by a predetermined path generated by said controller, said machine having a geometric configuration defining a generalized coordinate system independent of said first coordinate system, and said machine having a plurality of actuators with at least one of said actuators defining an axis of rotation affecting the position of the element, the method to be executed by the controller comprising the steps of:
a. storing the input signals;
b. calculating direction numbers in response to the first coordinate values of the two predetermined points, each direction number having a magnitude representing the magnitude of motion along a coordinate component relative to the first coordinate system of the predetermined path between the two predetermined points, and a sense representing the direction along the coordinate component;
c. calculating for a fixed interval of time and in response to the predetermined path velocity a number of iterations required to move along the predetermined path between the two predetermined points;
d. calculating for each fixed interval of time an incremental displacement to be moved with each iteration in response to the first coordinate values;
e. calculating, in response to the incremental displacement and the direction numbers, the coordinate values relative to the first coordinate system of an end point of the incremental displacement;
f. generating, in response to the coordinate values of the end point, individual control signals representing corresponding generalized coordinate values relative to the generalized coordinate system of said end point;
g. applying, during each fixed interval of time, the individual control signals to the servomechanism circuit to cause the actuators to move the element of the machine through the incremental displacement; and h. iterating steps (d) through (g) to cause the element of the machine to move at the predetermined path velocity along the predetermined path between the two predetermined points.

25. A method for operating a controller generating signals to a servomechanism circuit of a machine to control the position of an element thereof in response to a program comprised of input signals representing predetermined path velocities between and first coordinate values relative to a first coordinate system of predetermined points being connected by predetermined paths generated by said controller, said machine having a plurality of actuators defining a plurality of axes of motion with at least one of said actuators defining an axis of rotation affecting the position of the element, and said controller being responsive to the input signals for controlling the machine in relation to a generalized coordinate system independent of said first coordinate system and defined by the geometric configuration of the machine, the method to be executed by the controller comprising the steps of:

a. storing the input signals;
b. generating, in response to the input signals representing a predetermined path velocity between and first coordinate values of two of the predetermined points, a set of intermediate coordinate values in the first coordinate system defining a successive point along a predetermined path connecting the two predetermined points;
c. calculating, in response to the set of intermediate coordinate values, a set of error quantities representing the difference between the set of intermediate coordinate values and a set of initial coordinate values in the first coordinate system;
d. reducing the error quantities to a predetermined magnitude by generating a set of generalized coordinate values in the generalized coordinate system corresponding to the set of intermediate coordinate values;
e. applying the set of generalized coordinate values to the servomechanism circuit to cause the actuators to move the element of the machine to the successive point;
f. iterating steps (b) through (e) to move the element of the machine along the predetermined path at the predetermined path velocity; and
g. iterating steps (b) through (f) to move the element of the machine at the predetermined path velocities along the predetermined paths connecting the predetermined points.

26. The method of claim 25, wherein the step of calculating a set of error quantities further comprised the steps of:

a. computing a set of initial coordinate values in the first coordinate system as a function of a set of assumed coordinate values in the generalized coordinate system; and
b. calculating a set of error quantities by computing the difference between the set of initial coordinate values and the set of intermediate coordinate values.

27. The method of claim 26, wherein the step of reducing the error quantities further comprises the steps of:

a. computing a set of calculated coordinate values in the generalized coordinate system using the set of error quantities and a set of previously determined coordinate values in the generalized coordinate system;
b. computing a set of new coordinate values in the first coordinate system as a function of the calculated coordinate values;
c. calculating a set of new error quantities by computing the difference between the set of intermediate coordinate values and the set of new coordinate values;
d. comparing the set of new error quantities to a predetermined magnitude; and
e. iterating steps (a) through (d) until the set of new error quantities is reduced below the predetermined magnitude.

* * * * *

UNITED STATES PATENT OFFICE
CERTIFICATE OF CORRECTION

PATENT NO. : 3,909,600
DATED : September 30, 1975
INVENTOR(S) : R. E. Hohn

It is certified that error appears in the above-identified patent and that said Letters Patent are hereby corrected as shown below:

In the title, "AUTOMATION" should read "AUTOMATON.

In Column 12, in line 12, delete the " $\lambda$ " and delete the hyphens at the end of lines 10 and 14.

In Column 17, in line 45, after "alized", insert --<u>direction number signal having a magnitude representing the magnitude of</u> --.

In Column 20, in line 19, after "sets", insert --<u>of</u>--.

In Column 22, in line 37, delete "7" and insert --<u>18</u>--.

Signed and Sealed this twentieth Day of January 1976

[SEAL]

Attest:

RUTH C. MASON
*Attesting Officer*

C. MARSHALL DANN
*Commissioner of Patents and Trademarks*